(12) United States Patent
Schroeder

(10) Patent No.: US 8,029,193 B2
(45) Date of Patent: Oct. 4, 2011

(54) GUIDE RAIL AND METHOD FOR MANUFACTURING SAME

(75) Inventor: Robert Schroeder, Machesney Park, IL (US)

(73) Assignee: Pacific Bearing Company, Rockford, IL (US)

( * ) Notice: Subject to any disclaimer, the term of this patent is extended or adjusted under 35 U.S.C. 154(b) by 422 days.

(21) Appl. No.: 12/398,205

(22) Filed: Mar. 5, 2009

(65) Prior Publication Data
US 2009/0226122 A1 Sep. 10, 2009

Related U.S. Application Data

(60) Provisional application No. 61/034,540, filed on Mar. 7, 2008.

(51) Int. Cl.
*F16C 29/06* (2006.01)
*B21D 53/10* (2006.01)

(52) U.S. Cl. ............ 384/55; 384/43; 29/898.03

(58) Field of Classification Search ............ 384/43–45, 384/55
See application file for complete search history.

(56) References Cited

U.S. PATENT DOCUMENTS

| 1,500,116 | A | 7/1924 | Dowd |
| 3,900,233 | A | 8/1975 | Thomson |
| 4,025,995 | A | 5/1977 | Thomson |
| 4,635,331 | A | 1/1987 | Walter et al. |
| 5,059,037 | A | 10/1991 | Albert |
| 5,217,308 | A | 6/1993 | Schroeder |
| 5,289,779 | A | 3/1994 | Ohya et al. |
| 5,431,498 | A | 7/1995 | Lyon |
| 5,800,065 | A | 9/1998 | Lyon |
| 5,930,898 | A | 8/1999 | Lyon |
| 6,052,902 | A | 4/2000 | Lyon |
| 6,086,254 | A | 7/2000 | Lyon |
| 6,484,599 | B2 | 11/2002 | Blaurock |
| 6,508,589 | B2 | 1/2003 | Kashiwagi et al. |
| 7,300,208 | B2 | 11/2007 | Kuellstaedt et al. |
| 2001/0012417 | A1 | 8/2001 | Kashiwagi et al. |
| 2005/0169559 | A1 | 8/2005 | Mochizuki et al. |
| 2005/0232521 | A1 | 10/2005 | Kuellstaedt et al. |
| 2005/0281497 | A1 | 12/2005 | Akiyama et al. |

FOREIGN PATENT DOCUMENTS

| DE | 1 222 322 | 8/1966 |
| DE | 3504061 A1 | 8/1986 |
| DE | 44 28 558 A1 | 2/1996 |
| EP | 0213160 A1 | 3/1987 |
| EP | 0 258 714 A1 | 3/1988 |
| EP | 0 353 396 A | 2/1990 |
| JP | 07-217651 A | 8/1995 |
| JP | 2007-046691 A | 2/2007 |
| WO | WO 86/04651 A1 | 8/1986 |
| WO | WO 2006/061076 A1 | 6/2006 |

*Primary Examiner* — Thomas R Hannon
(74) *Attorney, Agent, or Firm* — Reinhart Boerner Van Deuren P.C.

(57) ABSTRACT

A guide rail and method of forming a guide rail is provided. The guide rail includes a base rail having a groove with a plurality of fingers formed therein and a race insert mounted in the groove. The race insert has at least two different load directions. The fingers extend generally non-parallel to the different load directions. The fingers are preferably deformed into a state of bending.

19 Claims, 1 Drawing Sheet

GUIDE RAIL AND METHOD FOR MANUFACTURING SAME

CROSS-REFERENCE TO RELATED PATENT APPLICATIONS

This patent application claims the benefit of U.S. Provisional Patent Application No. 61/034,540, filed Mar. 7, 2008, the entire teachings and disclosure of which are incorporated herein by reference thereto.

FIELD OF THE INVENTION

This invention generally relates to guide rails and more particularly guide rails including a base rail including at least one raceway insert.

BACKGROUND OF THE INVENTION

Guide rails are used as a bearing and guide to support and direct the movement of a carriage, also known as a saddle, mounted to the guide rail. In some embodiments, the carriages will include metal rollers or guide wheels that ride on raceways of the guide rail.

As technology continues to strive to reduce weight, manufacturing time and manufacturing costs (with an emphasis on material costs) while maintaining structural integrity and tolerancing, numerous guide rail configurations have been developed.

One particular configuration is the use of a base rail formed of a lighter weight, cheaper base material such as aluminum to which harder, more wear resistant, and accurate raceways are mounted.

For example, U.S. Pat. No. 5,800,065 to Lyon teaches providing an extruded base member including a longitudinal groove on opposite sides of the base member. A carriage race is inserted into each of the grooves. The teachings and disclosure of U.S. Pat. No. 5,800,065 are hereby incorporated in its entirety by reference thereto.

U.S. Pat. No. 7,300,208 to Kuellstaedt teaches a similar guide rail that includes support ribs formed in the bottom of the grooves of the base member that are deformed during assembly of the guide rails. U.S. Pat. No. 7,300,208 emphasizes the importance of having the support ribs substantially parallel to the load transmission direction of the race. This configuration allows the support ribs to deform in a mushroom pattern with a portion of the rib deforming to both sides of the rib and permits generally placing the support ribs in a state of compression rather than bending. Further, these ribs extend at an angle relative to the direction in which the race is roller inserted into the grooves of the base member. The teachings and disclosure of U.S. Pat. No. 7,300,208 are hereby incorporated in its entirety by reference thereto.

The present invention provides improvements over the guide rails taught by U.S. Pat. No. 5,800,065 and U.S. Pat. No. 7,300,208.

BRIEF SUMMARY OF THE INVENTION

The present invention has several aspects that may be claimed and stand as patentable independently and individually or in combination with other aspects, including but not limited to the following.

In one embodiment of the invention, a guide rail includes a base rail and a race insert mounted to the base rail. The base rail includes a mounting groove. A plurality of fingers extend from a bottom of the groove. The race insert has two race ways that have different load transmission directions. Each race way is associated with a corresponding portion of the plurality of fingers. The load direction of the corresponding race way is non-parallel to the corresponding portion of the plurality of fingers. The race insert is mounted against the plurality of fingers.

In another embodiment of the invention, a method of forming a guide rail is provided. One step of the method includes forming at least one groove having a plurality of fingers extending from a base of the groove in a base rail. Another step includes mounting a race insert to the base rail with the race insert pressed in contact with the plurality of fingers. The step of mounting the race insert includes bending a first set of the plurality of fingers in a first direction and bending a second set of the plurality of fingers in a second direction, generally opposite the first direction.

Other embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
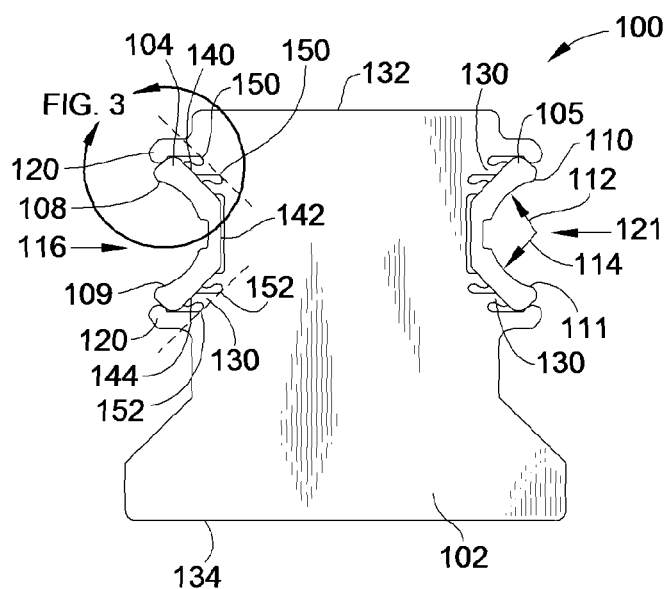
FIG. 1 is an exemplary embodiment of a guide rail in accordance with the teachings of the present invention.

FIG. 1 illustrates a guide rail 100 according to the teachings of the present invention. The guide rail 100 includes a base rail 102 and a pair of race inserts 104, 105 mounted to the base rail 102. The base rail 102 is preferably formed from a lighter and/or softer material than the race inserts 104, 105. Typically, the base rail 102 is an extrusion formed from aluminum and the race inserts 104, 105 are a steel or other wear-resistant material.

In a preferred embodiment, the race inserts 104, 105 form a gothic arch profile including race ways 108-111. As is known in the art, a ball bearing (not shown) carried by the raceways 108-111 will only contact the race ways 108-111 at a single point when using a gothic arch profile. Further, as is more fully described in U.S. Pat. No. 7,300,208, such a race insert 104, 105 includes two load transmission lines that extend at an angle relative to one another. These load transmission lines are illustrated by arrows 112, 114. However, other designs and profiles may be used while remaining within the scope of the present invention.

The race inserts 104, 105 are mounted in grooves 116, 118 formed in opposed sides of the base rail 102. Typically, tabs 120 are swaged over the ends of the race inserts 104, 105 to secure the race inserts 104, 105 within the grooves 116, 118.

When assembling the guide rail 100, the race inserts are inserted laterally into the grooves 116, 118 along a direction illustrated generally by arrow 121.

The grooves 116, 118 further include biasing fingers 130 that support the race inserts 104, 105. Prior to assembly of the guide rail 100, the fingers 130 extend generally parallel to one another, as well as the direction of insertion, i.e. arrow 121, and laterally outward from the base of grooves 116, 118.

In this configuration, the fingers 130 are non-parallel with load transmission lines 112, 114.

During mounting of the race inserts 104, 105, the race inserts are inserted along the direction of arrow 121. During this process, a sufficient force is applied to the race inserts 104, 105 to cause the fingers 130 to deform substantially under a state of bending. More particularly, the fingers 130 associated with a top portion of race insert 104, 105 bend toward the top 132 of the base rail 102 and therefore deform away from the bottom portion of a race insert 104, 105. Similarly, the fingers 130 associated with a bottom portion of race insert 104, 105 bend toward the bottom 134 of the base rail 102 and, therefore, deform away from the top portion of the race insert 104, 105. During this assembly, the fingers are cammed against the back surfaces of the race inserts 104, 105 to cause the fingers to bend. In other words, the tips of the fingers contact the back surface of the race inserts 104, 105 and then as the race inserts 104, 105 are continually pushed into the grooves, the fingers 130 slide along back surface of the race inserts 104, 105 and are bent.

By placing the fingers 130 in a state of bending, it is contemplated that a more controlled deformation of the fingers 130 can be accomplished. As such, tolerancing of the race ways 108-111 is believed to be more accurately controlled.

In some embodiments, the extent of bending the fingers 130 is between about 5 degrees and 35 degrees. Further, the bending may be more arcuate in nature than is illustrated in the figures.

Figure 2:
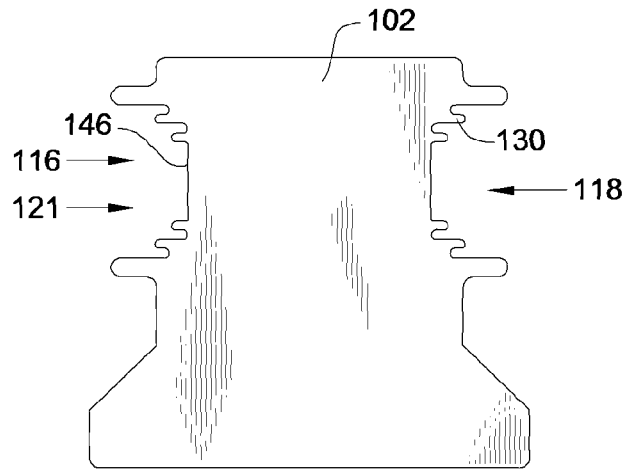
FIG. 2 is an end illustration of the base rail of the guide rail of FIG. 1.
Figure 3:
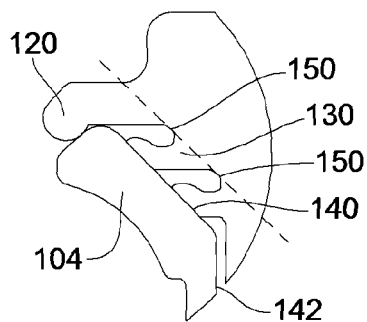
FIG. 3 is an enlarged partial illustration of the guide rail of FIG. 1 illustrating the mounting arrangement of the race insert mounted to the base rail.

With reference to FIG. 2, it will be noted that the configuration of the illustrated embodiment is free of undercuts between adjacent ones of the fingers 130 which can assist in the event that the fingers 130 are machined into the base rail 102. In such an arrangement, a grinder having a rotating axis extending perpendicularly to the insertion direction 121 can be used so that all of the fingers are cut with a grinding wheel rotating in the same direction. Thus, all material for each finger will be exposed to similar machining characteristics. If undercuts were provided, the grinding wheel would have to be inserted with an axis of rotation generally parallel to insertion direction 121 such that the top portion and bottom portion of fingers 130 would be ground by opposite sides of a wheel, which can provide different machining characteristics to the fingers 130, such as material flow directions.

In the illustrated embodiment, each race insert 104, 105 includes first, second and third back surface segments 140, 142, 144 (numbered and discussed in terms of race insert 104). The first and third back surface segments 140 extend at non parallel and non-perpendicular angles to second back surface segment 142. In the illustrated embodiment, the first and third back surface segments 140, 144 face away from one another.

Prior to deformation of fingers 130 that associate with the first back surface 140, the tips of the fingers 130 generally are aligned at an angle relative to the bottom of the channel 146 (see FIG. 2) that is the same angle as the first back surface segment 144 aligns with the second back surface segment 142. The same arrangement is true with regard to the fingers 130 that associate with the third back surface 144. As such, a line segment passing through the bases 150, 152 where the fingers 130 extend from are preferably parallel to the corresponding first or third back surface segments 140, 144.

Further, in the illustrated embodiment, no fingers 130 engage the second back surface 142. This is because back surface 142 is generally perpendicular to insertion direction 121. The use of fingers 130 to contact these regions would result in the fingers being axially mushroomed and placed into a state of compression rather than a state of bending as discussed previously.

As such, each of the fingers 130 extend laterally outward a same distance. This distance is measured on a same side of the fingers 130 in which the fingers will be bent during insertion of the race inserts 104, 105. This arrangement promotes substantially constant bending forces throughout the various fingers 130 during assembly of the guide rail 100. This constant distance is illustrated in FIG. 2. Further, as the fingers 130 are not compressed or mushroomed, the thickness of the fingers 130, perpendicular to the cantilevered length of the fingers 130, remains substantially constant even after assembly. This constant thickness is provided by the beneficial arrangement of having the fingers 130 in a state of bending rather than a state of compression further promoting more consistent loading of the race inserts 104, 105 by fingers 130.

In the illustrated embodiment, only two fingers 130 are associated with a given back surface segment 140, 144. However, in other embodiments, more or less fingers can be used depending on the length of the back surface and desired support and resistance during assembly.

In the illustrated embodiment, all of the fingers 130 that are associated with the first back surface segment 140 are laterally bent away from the fingers 130 that are associated with third back surface segment 140. This is because the first, and second surfaces face away from one another. However, if a different profile, such as V-profile were used, where the fingers 130 are located internal to the V-profile, the fingers 130 associated with one back surface segment would be laterally bent toward the fingers 130 associated with the other back surface segment of the V-profile.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A guide rail comprising:
   a base rail including a mounting groove formed therein;
   a first plurality of fingers extending from a first portion of the bottom of the groove;
   a second plurality of fingers extending from a second portion of the bottom of the groove; and
   a race insert having two race ways that have different load transmission directions, each race way associated with a corresponding portion of the plurality of fingers, wherein the load direction of the corresponding race way is non-parallel to the corresponding portion of the plurality of fingers, the race insert being mounted against the plurality of fingers.

2. The guide rail of claim 1, wherein the plurality of fingers are deformed into a state of bending by the race insert.

3. The guide rail of claim 2, wherein the fingers of a first portion of the plurality of fingers are bent in a first direction and a second portion of the plurality of fingers are bent in a second direction, the first and second directions being generally away from each other.

4. The guide rail of claim 3, wherein the first portion of the bottom of the groove extends at an angle relative to the second portion of the bottom of the groove.

5. The guide rail of claim 4, wherein the base rail has a back surface that is separated into first, second and third back surface segments, the first and third back surface segments extending at non-parallel and non-perpendicular angles to the second back surface, the first back surface segment facing away from the third back surface segment, the first plurality of fingers biased against the first back surface segment, the second plurality of fingers biased against the third back surface segment.

6. The guide rail of claim 5, wherein the second back surface segment is interposed between the first and third back surface segments, the second back surface being free from engagement by any fingers.

7. The guide rail of claim 6, wherein the first portion of the base is generally parallel to the first back surface segment and the second portion of the base is generally parallel to the second back surface segment.

8. The guide rail of claim 1, wherein the bottom of the groove includes a third portion interposed between the first and second portions, the third portion being free of any fingers, the first and second plurality of fingers extending substantially perpendicular in relation to the third portion.

9. The guide rail of claim 8, wherein the first and second plurality of fingers having a same cantilevered length and a same constant thickness in their deformed state that is substantially perpendicular to the cantilevered length.

10. The guide rail of claim 9, wherein the two race ways of the race insert form a gothic arch.

11. A method of forming a guide rail comprising the steps of:
    forming at least one groove having a plurality of fingers extending from a bottom of the groove in a base rail;
    mounting a race insert to the base rail with the race insert pressed in contact with the plurality of fingers;
    wherein mounting the race insert includes bending a first set of the plurality of fingers in a first direction and bending a second set of the plurality of fingers in a second direction, generally opposite the first direction, such that the fingers are biased against the race insert.

12. The method of claim 11, wherein the race insert has two race ways having different load transmission directions, and the step of mounting includes inserting the race insert into the groove along an insertion direction, the insertion direction being oblique relative to the load transmission directions.

13. The method of claim 12, wherein the step of forming at least one groove includes forming the plurality of fingers such that the fingers of the first set of the plurality of fingers are generally parallel to one another prior to the step of mounting and such that the fingers of the second set of the plurality of fingers are generally parallel to one another prior to the step of mounting.

14. The method of claim 13, wherein the step of forming at least one groove includes forming the plurality of fingers such that all of the fingers are generally parallel to one another prior to the step of mounting.

15. The method of claim 13, wherein the step of forming at least one groove is performed by extruding the base rail.

16. The method of claim 13, wherein the step of forming at least one groove is performed by machining the base rail.

17. The method of claim 13, wherein bending the fingers includes bending the fingers to a final degree of between about five degrees and twenty five degrees relative to the insertion direction.

18. The method of claim 13, wherein the race insert includes a first back surface segment and a second back surface segment, the first and second back surface segments extending at a common, but opposite, angle relative to the insertion direction such that the first and second back surfaces face away from one another, and wherein the step of mounting includes camming the ends of the first set of the plurality of fingers against the first back surface segment to bend the first set of the plurality of fingers and camming the ends of the second set of the plurality of fingers against the second back surface segment to bend the second set of the plurality of fingers.

19. The method of claim 11, wherein the step of bending the fingers is substantially free of compressing the fingers.

* * * * *